US012775796B1

(12) United States Patent
Paiuk

(10) Patent No.: US 12,775,796 B1
(45) Date of Patent: Oct. 27, 2026

(54) ARTIFICIAL INTELLIGENCE TO IDENTIFY A RECIPIENT FOR A COMMUNICATION

(71) Applicant: Zoom Communications, Inc., San Jose, CA (US)

(72) Inventor: Alejandro Martin Paiuk, West Hartford, CT (US)

(73) Assignee: Zoom Communications, Inc., San Jose, CA (US)

( * ) Notice: Subject to any disclaimer, the term of this patent is extended or adjusted under 35 U.S.C. 154(b) by 121 days.

(21) Appl. No.: 18/523,127

(22) Filed: Nov. 29, 2023

(51) Int. Cl.
*G06F 3/0481* (2022.01)
*G06F 40/174* (2020.01)
*G06F 40/279* (2020.01)
*H04L 51/48* (2022.01)

(52) U.S. Cl.
CPC .......... *G06F 40/279* (2020.01); *G06F 3/0481* (2013.01); *G06F 40/174* (2020.01); *H04L 51/48* (2022.05)

(58) Field of Classification Search
None
See application file for complete search history.

(56) References Cited

U.S. PATENT DOCUMENTS

| | | | | |
|---|---|---|---|---|
| 10,241,752 | B2 * | 3/2019 | Lemay | G06Q 30/02 |
| 11,539,757 | B1 * | 12/2022 | Evans | H04L 65/1016 |
| 12,254,878 | B1 * | 3/2025 | Rottmann | G10L 15/26 |
| 2007/0055656 | A1 * | 3/2007 | Tunstall-Pedoe | G06N 5/00 |
| 2012/0259633 | A1 * | 10/2012 | Aihara | H04M 1/72436 704/235 |
| 2016/0260433 | A1 * | 9/2016 | Sumner | G06F 40/30 |
| 2018/0052573 | A1 * | 2/2018 | Comertoglu | G06F 16/14 |
| 2018/0144346 | A1 * | 5/2018 | Yu | G06Q 20/4014 |
| 2020/0106733 | A1 * | 4/2020 | Van Rensburg | H04L 51/224 |
| 2021/0182796 | A1 * | 6/2021 | Mankhand | G06F 16/252 |
| 2022/0172715 | A1 * | 6/2022 | Carbune | G06N 20/00 |
| 2022/0311728 | A1 * | 9/2022 | Sivaswamy | G06N 3/084 |
| 2023/0112859 | A1 * | 4/2023 | Vilhauer | H04M 1/271 455/414.1 |
| 2023/0317066 | A1 * | 10/2023 | Hueser | G10L 15/063 704/243 |
| 2023/0352014 | A1 * | 11/2023 | Tennant | G10L 15/18 |
| 2024/0005925 | A1 * | 1/2024 | Bleeker | H04M 3/527 |
| 2024/0098147 | A1 * | 3/2024 | Hasan | H04L 69/16 |
| 2025/0252252 | A1 * | 8/2025 | Shetty | G06K 7/1417 |

OTHER PUBLICATIONS

Google, The Keyword, Learn as you search (and browse) using generative AI, https://blog.google/products/search/google-search-generative-ai-learning-features/, Rany Ng, Aug. 15, 2023, 5 pages.

(Continued)

*Primary Examiner* — Tuyetlien T Tran
(74) *Attorney, Agent, or Firm* — Young Basile Hanlon & MacFarlane, P.C.

(57) ABSTRACT

A server receives, from a client device, a natural language input associated with a recipient of a communication. The server identifies, using an artificial intelligence language model, one or more communication addresses of one or more entities corresponding to the natural language input. The server transmits the one or more communication addresses to the client device.

22 Claims, 9 Drawing Sheets

(56) References Cited

OTHER PUBLICATIONS

Algolia, What is AI-powered site search?, https://www.algolia.com/blog/ai/what-is-ai-powered-site-search/, John Stewart, Nov. 17, 2023, 13 pages.
Google, The Keyword, Supercharging Search with generative AI, https://blog.google/products/search/generative-ai-search/, Elizabeth Reid, May 10, 2023, 6 pages.
Mental Floos, 1-800-GOOG-411, https://www.mentalfloss.com/article/17531/1-800-goog-411, Chris Higgins, Dec. 6, 2007, 4 pages.
Algolia, AI-powered search: the next ecommerce growth driver, https://resources.algolia.com/ebooks/ebook-aisearch, retrieved from internet Nov. 29, 2023, 66 pages.

* cited by examiner

800

EMAIL: ANNE@EXAMPLE.COM
MOBILE: +1-999-555-1234
SIP:1-999-123-4567@VOIP-PROVIDER.EXAMPLE.NET

NAME: ANNE DOE

TITLE: SENIOR IN-HOUSE PATENT COUNSEL

SUPERVISOR: BEN BITDIDDLE

SUBORDINATES: CINDY ROE, JOHN Q. SAMPLE

SKILLS: PATENTS, COMPUTER SCIENCE, ARTIFICIAL INTELLIGENCE

EXPERIENCE:
ABC CORPORATION – JUNIOR IN-HOUSE PATENT COUNSEL
DEF LAW FIRM – ASSOCIATE ATTORNEY
ABC CORPORATION – ARTIFICIAL INTELLIGENCE ENGINEER

EDUCATION:
GHI LAW SCHOOL – J.D.
JKL COLLEGE – B.S.C.S.

DESCRIPTION: ANNE MANAGES EXAMPLE CORPORATION'S PATENT PORTFOLIO OF ARTIFICIAL INTELLIGENCE INVENTIONS. ANNE PREVIOUSLY PRACTICED PATENT LAW IN THE IN-HOUSE AND LAW FIRM SETTINGS.

FIG. 8

ARTIFICIAL INTELLIGENCE TO IDENTIFY A RECIPIENT FOR A COMMUNICATION

FIELD

This disclosure generally relates to artificial intelligence, and, more specifically, to using artificial intelligence techniques to identify a recipient for a communication.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIG. 8 illustrates an example of a record in a communication directory.

DETAILED DESCRIPTION

Figure 1:
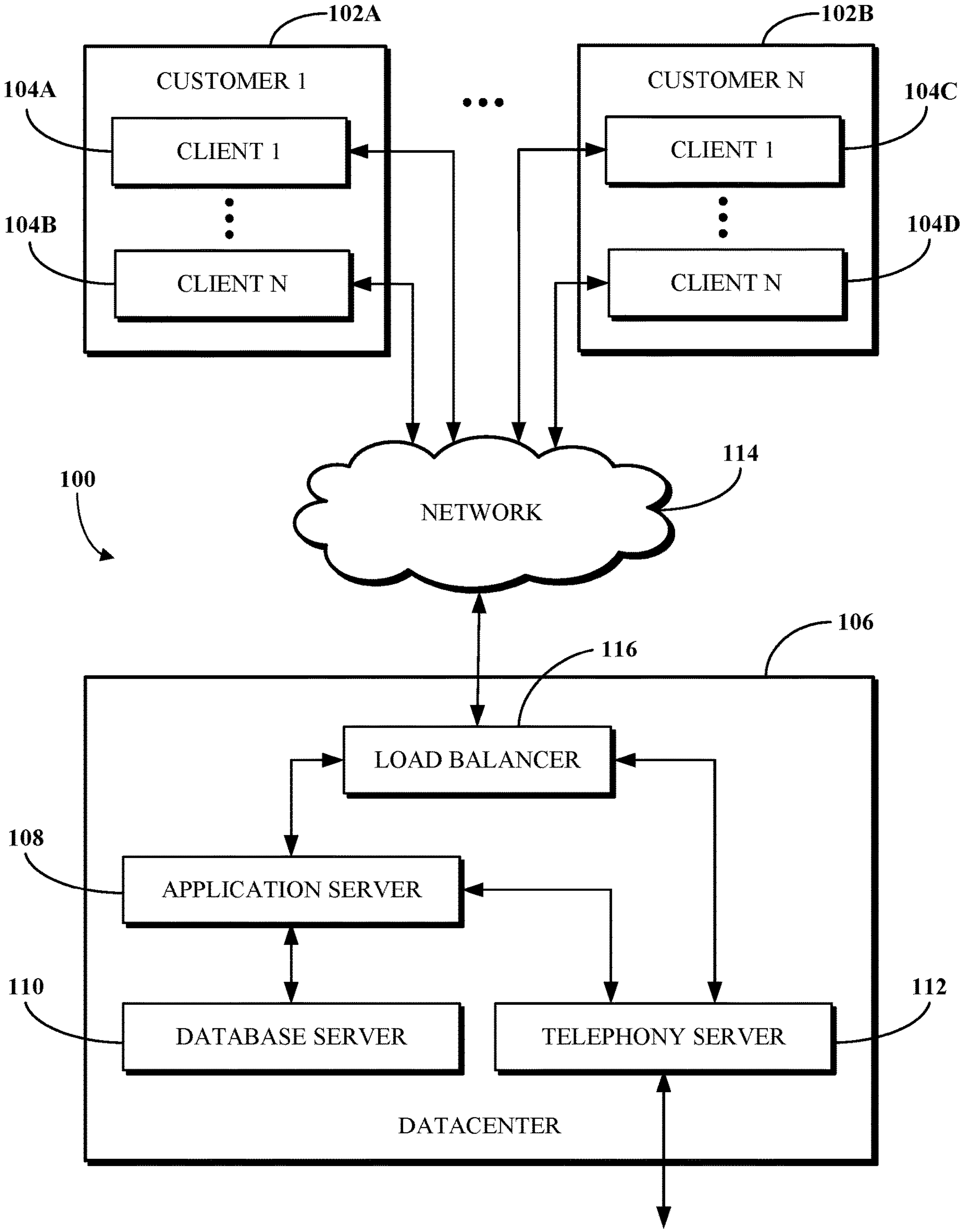
FIG. 1 is a block diagram of an example of an electronic computing and communications system.

The use of contact centers by or for service providers is becoming increasingly common to address customer support requests over various modalities, including telephony, video, text messaging, chat, and social media. In one example, a contact center may be implemented by an operator of a software platform, such as a unified communications as a service (UCaaS) platform or a contact center as a service (CCaaS) platform, for a customer of the operator. Users of the customer may engage with the contact center to address support requests over one or more communication modalities enabled for use with the contact center by the software platform. In another example, the operator of such a software platform may implement a contact center to address customer support requests related to the software platform itself.

In the last several years, the use of artificial intelligence techniques, such as large language models (LLMs) and generative pretrained transformers (GPTs) to generate text or other media for communication has skyrocketed (both in contact centers and in other usage scenarios). However, in some cases, a software user generating a communication might not know with whom to communicate. For example, a user might access a contact center of a credit card company to notify the credit card company that a credit reporting agency made the user aware that a fraudulent credit card application was filed, with the credit card company, in their name. The user may be automatically assigned to an initial contact center agent who is trained to answer general questions about accounts (e.g., "what is my balance" or "how can I pay my bill") but not at fraud prevention in account applications.

The initial contact center agent might not know who, at the credit card company, should be added to the engagement to process the information about the fraudulent application. To determine the appropriate person to be added (e.g., a representative from the fraud department or a representative from the new accounts department), the initial contact center agent might spend lots of time asking for assistance or might transfer the handling of the engagement to another inappropriate contact center agent. Either of these options could frustrate the user. As the foregoing illustrates, techniques for using artificial intelligence to automatically identify an appropriate recipient for a communication may be desirable.

Implementations of this disclosure address problems such as these using artificial intelligence (AI) and/or machine learning (ML) to identify an appropriate recipient for a communication. A server receives, from a client device, a natural language input (e.g., input including natural language text or audio) describing a recipient of a communication or a recipient to be added to an ongoing communication session (e.g., contact center engagement). The communication may be at least one of an email communication, an instant messaging communication, a voice conference, or a video conference.

In some implementations, a graphical user interface (GUI) of (e.g., rendered at, via a client application) the client device includes an input box for the destination field (e.g., the "to" field in a GUI for composing an email message or an input box for adding a new agent to an ongoing contact center engagement). In some examples, the user types a special character (e.g., '\') into the "to" field, followed by the natural language input (e.g., "\person responsible for preventing fraudulent new account applications"). As a result, the server determines that the text following the special character is the natural language input. In other implementations, the "to" field may be associated with an omnibox as the input box, where the omnibox is capable of receiving multiple different inputs. The multiple different inputs may include communication addresses (e.g., email addresses or addresses for text, voice or video communication) or descriptions of communication targets. For example, the user may type "jack@example.com" to communicate with a user associated with that communication address. Alternatively, the user may type "user responsible for fraud prevention who is online now," in order to communicate with such a user without first determining their communication address. In other implementations, the "to" field includes a check box, a radio button, a toggle bar icon, or another user interface to switch between providing address input and providing natural language input. In yet other implementations, there are two "to" fields input boxes—one for address input and another for natural language input. The user may leave one of the two "to" fields blank if they do not wish to include one of the inputs.

The server identifies, using a language model (e.g., a LLM or a GPT engine), one or more communication addresses associated with one or more entities matching the natural language input. In some cases, the language model accesses a corporate directory that includes the communication addresses of employees or contractors of the corporation, as well as information (e.g., a skill, a responsibility, an educational experience, a work experience, a geographic location, a resume, or publicly accessible social media information) of the employees or contractors. The server places the one or more communication addresses into the destination field of the communication for review by the user of the client device. The user of the client device may modify (e.g., add or remove) communication addresses from the destination field prior to sending or initiating the communication.

In some examples of the present disclosure, implementations may include or otherwise use one or more AI/ML systems having one or more models trained for one or more purposes. Use or inclusion of such AI/ML systems, such as for implementation of certain features or functions, may be turned off by default, where a user, an organization, or both must opt-in to utilize the features or functions that include or otherwise use an AI/ML system. User or organizational consent to use the AI/ML systems or features may be provided in one or more ways, for example, as explicit permission granted by a user prior to using an AI/ML feature, as administrative consent configured by administrator settings, or both. Users for whom such consent is obtained can be notified that they will be interacting with one or more AI/ML systems or features, for example, by an electronic message (e.g., delivered via a chat or email service or presented within a client application or webpage) or by an on-screen prompt, which can be applied on a per-interaction basis. Those users can also be provided with an easy way to withdraw their user consent, for example, using a form or like element provided within a client application, webpage, or on-screen prompt to allow individual users to opt-out of use of the AI/ML systems or features.

As used herein, the phrase "natural language" may refer to a language that is spoken or written by humans, and which occurs naturally in the human community. Examples of natural languages include English, French, Spanish, and Chinese. Natural languages are distinct from artificial or constructed languages, such as computer programming languages.

To enhance privacy and safety, as well as provide other benefits, the AI/ML processing system may be prevented from using a user's or organization's personal information (e.g., audio, video, chat, screen-sharing, attachments, or other communications-like content (such as poll results, whiteboards, or reactions)) to train any AI/ML models and instead only use the personal information for inference operations of the AI/ML processing system. Instead of using the personal information to train AI/ML models, AI/ML models may be trained using one or more commercially licensed data sets that do not contain the personal information of the user or organization.

To describe some implementations in greater detail, reference is first made to examples of hardware and software structures used to implement a system for identifying a recipient of a communication. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and a telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, the client 104 or the application server 108.

The telephony server 112 enables network-based telephony and web communications from and/or to clients of a customer, such as the clients 104A through 104B for the customer 102A or the clients 104C through 104D for the customer 102B. For example, one or more of the clients 104A through 104D may be voice over internet protocol (VOIP)-enabled devices configured to send and receive calls over a network 114. The telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
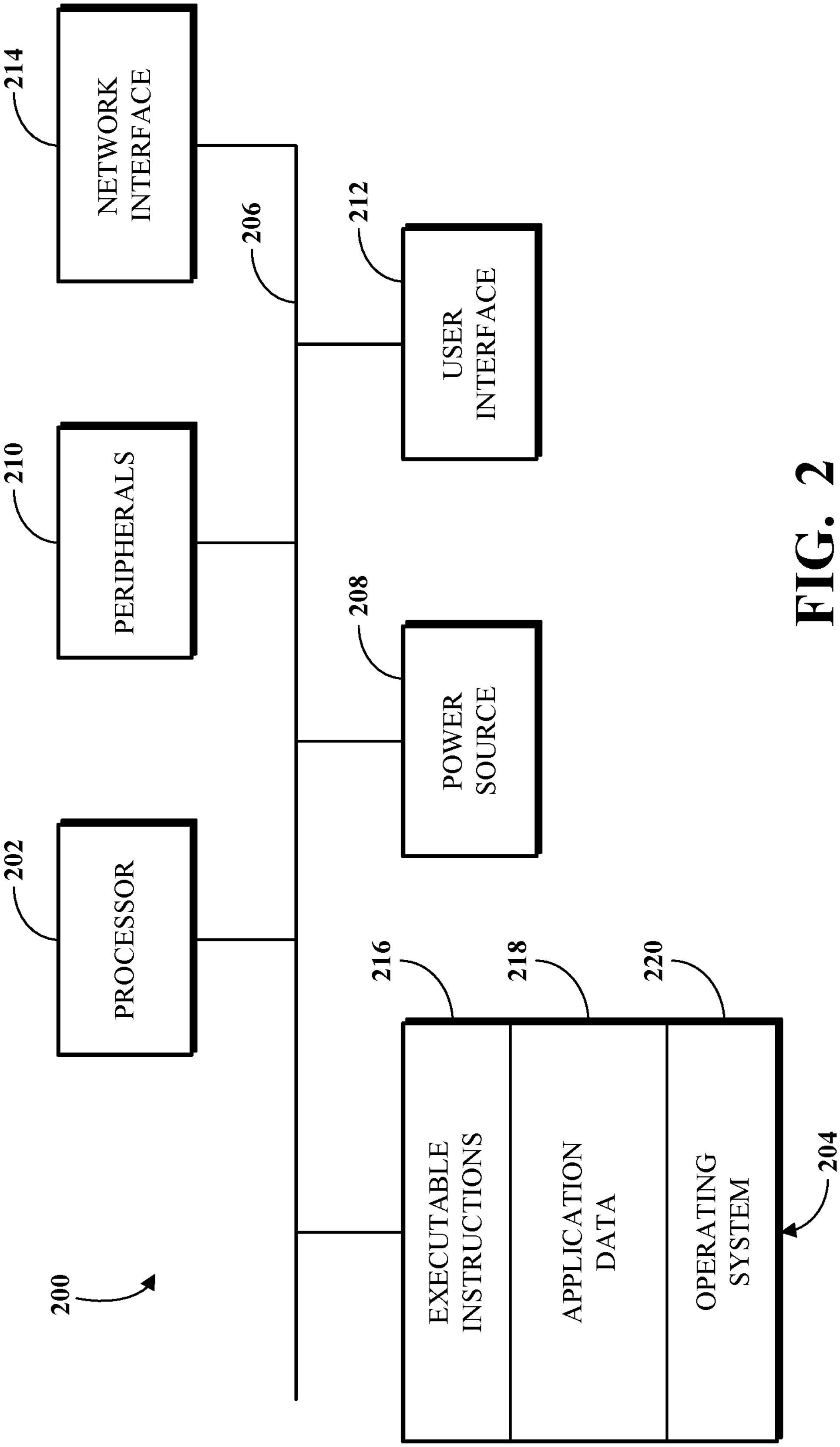
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device 200 may implement one or more of the client 104, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a DRAM module, such as DDR SDRAM). In another example, the non-volatile memory of the memory 204 can be a disk drive, a solid state drive, flash memory, or phase-change memory. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 3:
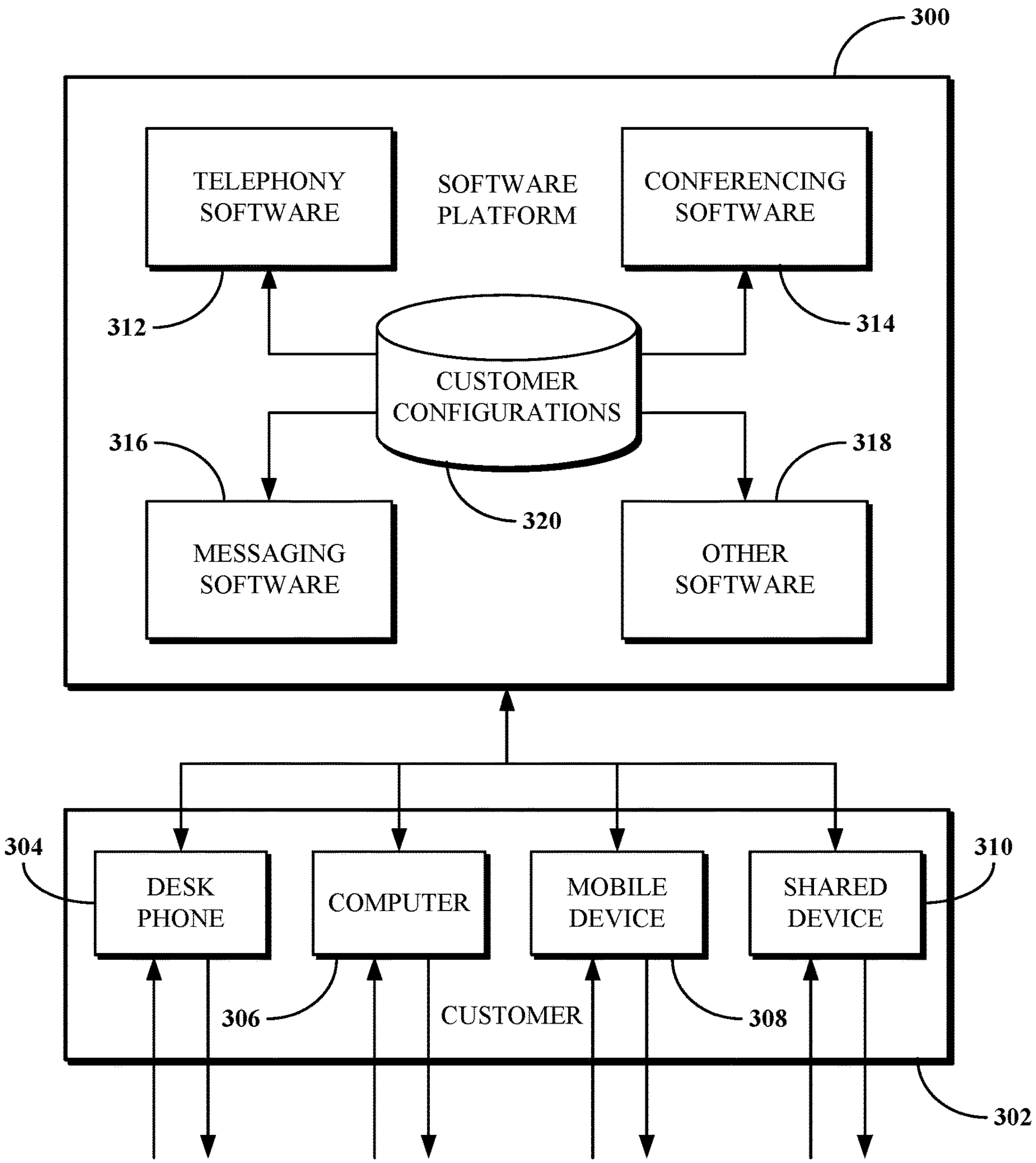
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302 as shown includes four clients-a desk phone 304, a computer 306, a mobile device 308, and a shared device 310. The desk phone 304 is a desktop unit configured to at least send and receive calls and includes an input device for receiving a telephone number or extension to dial to and an output device for outputting audio and/or video for a call in progress. The computer 306 is a desktop, laptop, or tablet computer including an input device for receiving some form of user input and an output device for outputting information in an audio and/or visual format. The mobile device 308 is a smartphone, wearable device, or other mobile computing aspect including an input device for receiving some form of user input and an output device for outputting information in an audio and/or visual format. The desk phone 304, the computer 306, and the mobile device 308 may generally be considered personal devices configured for use by a single user. The shared device 310 is a desk phone, a computer, a mobile device, or a different device which may instead be configured for use by multiple specified or unspecified users.

Each of the clients, including the desk phone 304, the computer 306, the mobile device 308, and the shared device 310, includes or runs on a computing device configured to access at least a portion of the software platform 300. In some implementations, the customer 302 may include additional clients not shown. For example, the customer 302 may include multiple clients of one or more client types (e.g., multiple desk phones or multiple computers) and/or one or more clients of a client type not shown in FIG. 3 (e.g., wearable devices or televisions other than as shared devices). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients, including the desk phone 304, the computer 306, the mobile device 308, and the shared device 310, and other telephony-enabled devices, which may be other ones of the clients, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, be sent or received using the desk phone 304, a softphone running on the computer 306, a mobile application running on the mobile device 308, or using the shared device 310 that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or other virtual conversation between users of those devices. The unified messaging functionality of the messaging software 316 may, for example, refer to email messaging which includes a voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include software for identifying a recipient of a communication.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some or all of the software 312 through 318 may be combined into a single software application run on clients of the customer, such as one or more of the clients, including the desk phone 304, the computer 306, the mobile device 308, and the shared device 310.

Figure 4:
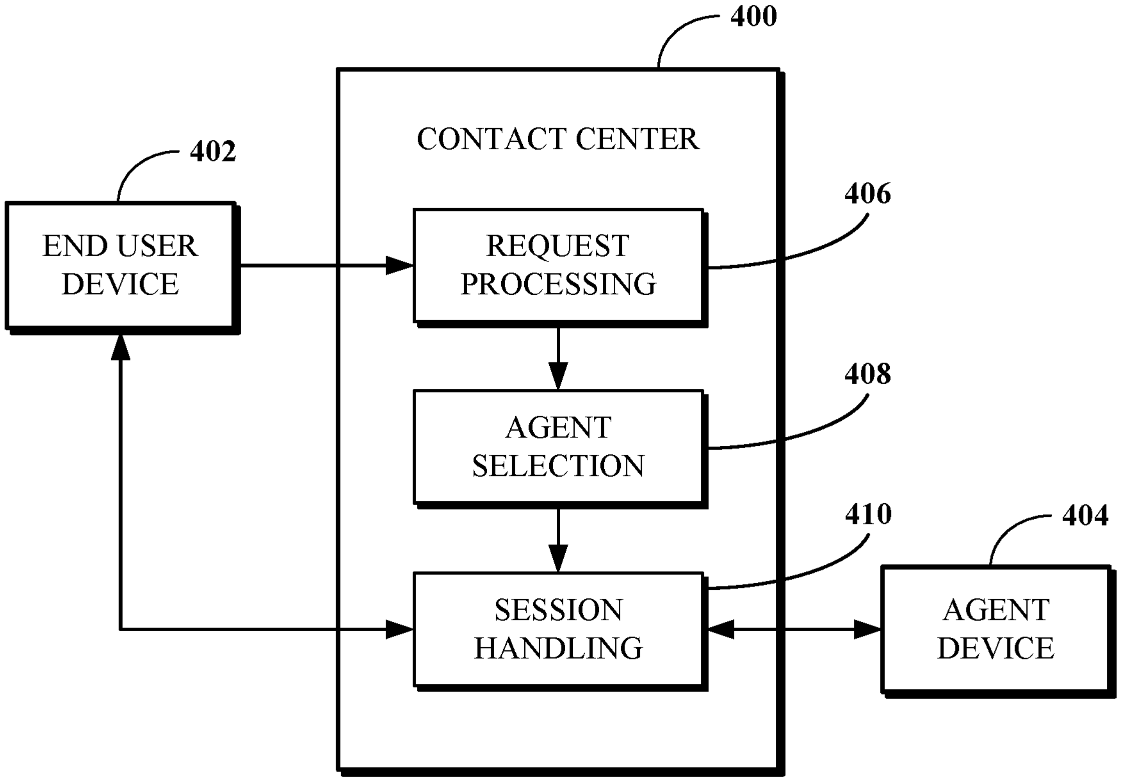
FIG. 4 is a block diagram of an example of a contact center system.

FIG. 4 is a block diagram of an example of a contact center system. A contact center 400, which in some cases may be implemented in connection with a software platform (e.g., the software platform 300 shown in FIG. 3), is accessed by a user device 402 and used to establish a connection between the user device 402 and an agent device 404 over one of multiple modalities available for use with the contact center 400, for example, telephony, video, text messaging, chat, and social media. The contact center 400 is implemented using one or more servers and software running thereon. For example, the contact center 400 may be implemented using one or more of the servers 108 through 112 shown in FIG. 1, and may use communication software such as or similar to the software 312 through 318 shown in FIG. 3. The contact center 400 includes software for facilitating contact center engagements requested by user devices such as the user device 402. As shown, the software includes request processing software 406, agent selection software 408, and session handling software 410.

The request processing software 406 processes a request for a contact center engagement initiated by the user device 402 to determine information associated with the request. The request may include a natural language query or a request entered in another manner (e.g., "press 1 to pay a bill, press 2 to request service"). The information associated with the request generally includes information identifying the purpose of the request and which is usable to direct the request traffic to a contact center agent capable of addressing the request. The information associated with the request may include information obtained from a user of the user device 402 after the request is initiated. For example, for the telephony modality, the request processing software 406 may use an interactive voice response (IVR) menu to prompt the user of the user device to present information associated with the purpose of the request, such as by identifying a category or sub-category of support requested. In another example, for the video modality, the request processing software 406 may use a form or other interactive user interface to prompt a user of the user device 402 to select options which correspond to the purpose of the request. In yet another example, for the chat modality, the request processing software 406 may ask the user of the user device 402 to summarize the purpose of the request (e.g., the natural language query) via text and thereafter process the text entered by the user device 402 using natural language processing and/or other processing.

The session handling software 410 establishes a connection between the user device 402 and the agent device 404, which is the device of the agent selected by the agent selection software 408. The particular manner of the connection and the process for establishing same may be based on the modality used for the contact center engagement requested by the user device 402. The contact center engagement is then facilitated over the established connection. For example, facilitating the contact center engagement over the established connection can include enabling the user of the user device 402 and the selected agent associated with the agent device 404 to engage in a discussion over the subject modality to address the purpose of the request from the user device 402. The facilitation of the contact center engagement over the established connection can use communication software implemented in connection with a software platform, for example, one of the software 312 through 318, or like software.

The user device 402 is a device configured to initiate a request for a contact center engagement which may be obtained and processed using the request processing software 406. In some cases, the user device 402 may be a client device, for example, one of the clients, including the desk phone 304, the computer 306, the mobile device 308, and the shared device 310, shown in FIG. 3. For example, the user device 402 may use a client application running thereat to initiate the request for the contact center engagement. In another example, the connection between the user device 402 and the agent device 404 may be established using software available to a client application running at the user device 402. Alternatively, in some cases, the user device 402 may be other than a client device.

The agent device 404 is a device configured for use by a contact center agent. Where the contact center agent is a human, the agent device 404 is a device having a user interface. In some such cases, the agent device 404 may be a client device, for example, one of the clients, including the desk phone 304, the computer 306, the mobile device 308, and the shared device 310, or a non-client device. In some such cases, the agent device 404 may be a server which implements software usable by one or more contact center agents to address contact center engagements requested by contact center users. Where the contact center agent is a non-human, the agent device 404 is a device that may or may not have a user interface. For example, in some such cases, the agent device 404 may be a server which implements software of or otherwise usable in connection with the contact center 400.

Although the request processing software 406, the agent selection software 408, and the session handling software 410 are shown as separate software components, in some implementations, some or all of the request processing software 406, the agent selection software 408, and the session handling software 410 may be combined. For example, the contact center 400 may be or include a single software component which performs the functionality of all of the request processing software 406, the agent selection software 408, and the session handling software 410. In some implementations, one or more of the request processing software 406, the agent selection software 408, or the session handling software 410 may be comprised of multiple software components. In some implementations, the contact center 400 may include software components other than the request processing software 406, the agent selection software 408, and the session handling software 410, such as in addition to or in place of one or more of the request processing software 406, the agent selection software 408, and the session handling software 410.

Figure 5:
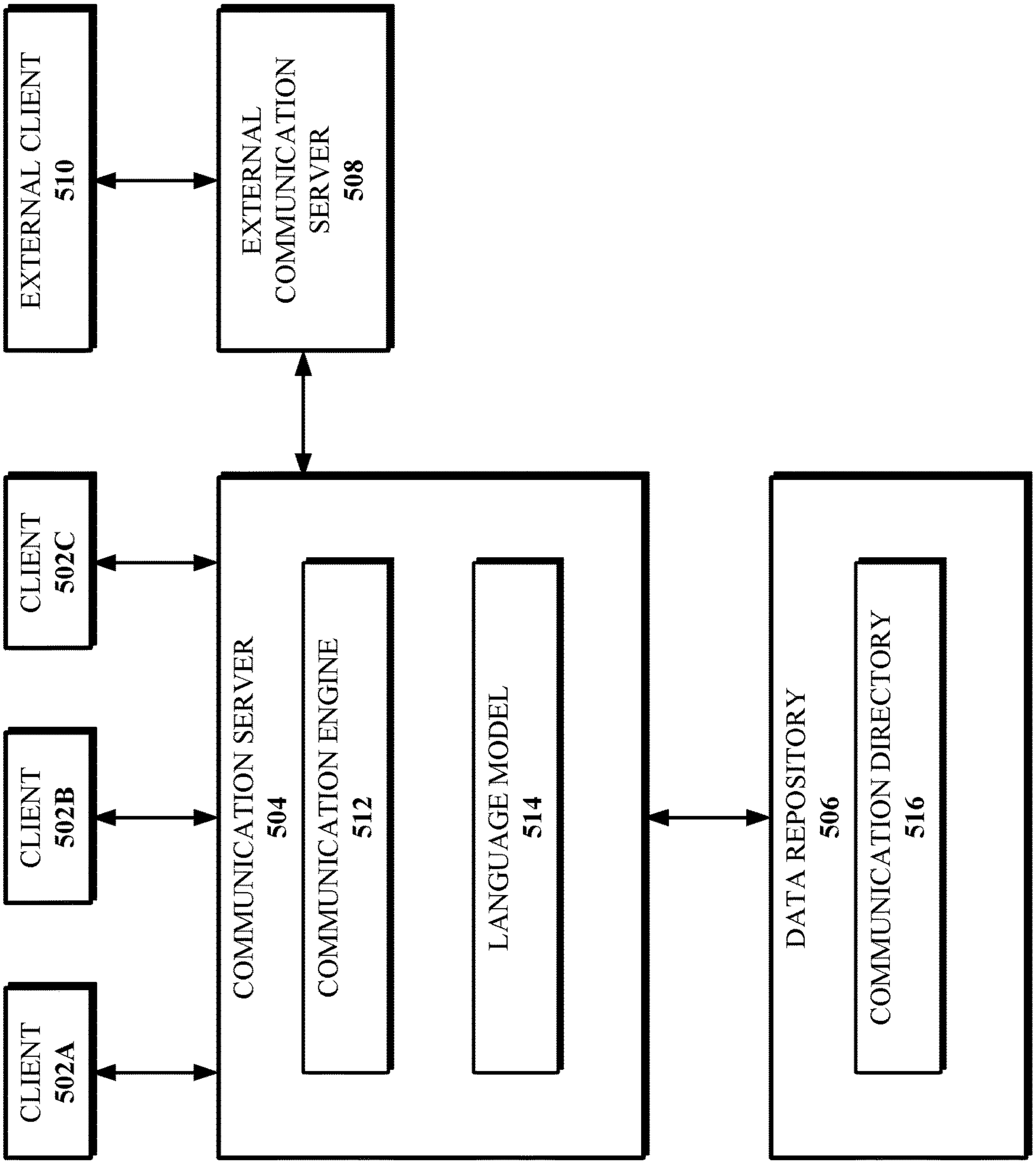
FIG. 5 is a block diagram of an example of a system for identifying a recipient for a communication.

FIG. 5 is a block diagram of an example of a system 500 for identifying a recipient for a communication. The system 500 may be implemented within a contact center and/or within another communication system. The system 500 may support communication using one or more communication technologies, for example, at least one of CCaaS, UCaaS, email, or telephone. As shown, the system 500 includes clients 502A-C, a communication server 504, a data repository 506, an external communication server 508, and an external client 510.

The clients 502A-C may be internal client devices, for example, of a business, a contact center administrator, or another entity. The communication server 504 may facilitate internal communications (e.g., using one or more media such as CCaaS, UCaaS, email, or telephone) within the entity. As shown, the communication server 504 is be coupled with a data repository 506 that stores information associated with the entity for use by the communication server 504. The communication server 504 is coupled with an external communication server 508 that processes external communications using the one or more media. The external communication server 508 is connected to an external client 510 and processes communications using the one or more media between the communication server 504 and the external client 510. The clients 502A-C may communicate with one another using the communication server 504. The clients 502A-C may communicate with the external client 510 using the communication server 504 and the external communication server 508.

As described above, the communication server 504 is separate from the external communication server 508. In some cases, a single machine (or a group of machines) may perform the functionality of both the communication server 504 and the external communication server 508. In some case, implementations of the technology disclosed herein may be performed using the communication server 504, which might or might not be connected to the external communication In some examples, the system 500 is a contact center system. The communication server 504 corresponds to a server of the contact center 400 and includes at least one of the request processing software 406, the agent selection software 408, or the session handling software 410. The clients 502A-C correspond to agent devices, such as the agent device 404. The external client 510 corresponds to the end user device 402.

In some examples, the communication server 504 is a mail server of an entity, such as a corporation. The clients 502A-C are internal clients of the entity, for example, client devices assigned to employees. The external communication serve 508 is an external mail server. The external client 510 is a client outside the entity, with which at least one of the clients 502A-C communicates by email.

In some examples, the system 500 leverages the software platform 300 and/or the computing and communications system 100. Each of the clients 502A-C may correspond to at least one of the clients 104A-D, the desk phone 304, the computer 306, the mobile device 308, or the shared device 310. The communication server 504 may correspond to at least one of the application server 108, the database server 110, or the telephony server 112. The communication server 504 may include at least one of the telephony software 312, the conferencing software 314, the messaging software 316, or the other software 318. The data repository 506 may correspond to a database accessible via the database server 110.

As shown, the communication server 504 includes a communication engine 512 and a language model 514. The communication engine 512 is configured to facilitate communications between clients 502A-C connected to the communication server 504 (and/or the external client 510 via the external communication server 508) using one or more communication media. The language model 514 is a LLM or GPT engine that generates an output based on a natural language input. For example, the language model 514 may be used to identify a recipient of a communication based on a natural language input describing the recipient, as described in greater detail below.

The data repository 506 includes a communication directory 516. The communication directory stores information related to users of the clients 502A-C that leverage the communication server 504 for their communications. For example, the communication directory 516 may store natural language descriptions of the roles, skills, and/or backgrounds of the users of the clients 502A-C. The communication directory 516 may store records of multiple entities (e.g., user identifiers), one or more communication addresses for each entity, and a natural language description of each entity. The natural language description may include, for example, at least one of a skill, a responsibility, an educational experience, a work experience, a geographic location, a resume, or publicly accessible social media information. An example of a record of the communication directory 516 is illustrated in FIG. 8 and described in greater detail below.

According to some schemes, a user of the client 502A specifies (e.g., via a GUI for initiating a communication session) an address of another device with which they wish to communicate, for example the client 502B. The address may be, for example, an email address, a telephone number, a SIP address, or an account identifier in a messaging system (e.g., for text, audio, video, or multimedia messaging). The communication server 504 receives, from the client 502A, the request to communicate with the address of the client 502B. in response, the communication server 504 initiates a communication session between the client 502A and the client 502B.

According to some implementations, a user of the client 502A generates an idea for a communication or composes a communication, but does not know to whom the communication should be addressed. This could occur, for example, in a contact center where an agent is speaking to a user and the user provides a prompt to which the agent is unable to respond themself, and does not personally know another agent who could respond. Alternatively, an employee of a corporation might compose an email suggesting improvements to an internal software system, but might not know the person or team who is responsible for managing that software system. The user of the client 502A might provide a text input (or other form of input, for example, audio or video) describing the person with which they wish to communicate. Alternatively, the user of the client 502A might compose an email (or other communication, such as an attached file to a chat message) and enter an input (e.g., press a button) for the communication server 504 to suggest a recipient for the email.

The text input or other input describing the person could be provided via an input box displayed in the GUI for initiating or composing a communication. In some examples, the input box for the communication address (e.g., the "to" field) is an omni box that could receive either an input of an address or a search input of natural language text. If the input is one or more email addresses, (e.g., "john.doe@example.com") the communication is directed to those addresses. If the input includes natural language input (e.g., "information technology employee who is responsible for software on my computer"), the communication server 504 leverages the language model 514 to search the communication directory 516 of the data repository 506 to identify one or more communication addresses that correspond to the natural language input. The identified one or more communication addresses are presented, via the client 502A, to the user for their review and approval prior to initiation or transmission of the communication.

The communication directory 516 stores information describing users of communication addresses associated with the clients 502A-C coupled to the communication server 504. The users of the clients 504A-C may be, for example, agents in a contact center or employees of a corporation. In some cases, the communication directory 516 may also include information describing a user of a communication address associated with the external client 510, for example, if the external client 510 corresponds to a specialist contact center agent who works outside the contact center or to a vendor or a contractor of the corporation who works outside the corporation. Users of the clients 502A-C and/or the external client 510 are notifies that their information is to be stored in the communication directory 516 and provide affirmative consent to such information storage. The users may modify their stored information and/or request its removal at any time. The stored information may include at least one communication address and/or a natural language description of the associated user. The natural language description may include at least one of a skill, a responsibility, an educational experience, a work experience, a geographic location, a resume, or publicly accessible social media information.

In summary, the communication server 504 receives, from the client 502A, a natural language input associated with a recipient of a communication being composed at or initiated via the client 502A. The communication server 504 leverages the language model 514 and the communication directory 516 to identify one or more communication addresses of one or more recipients corresponding to the natural language input. The communication addresses may correspond to the communication medium being used, at the client 502A, to initiate the communication. For example, if the communication medium is video calling application, the communication addresses may be video calling addresses (or video calling account identifiers) of users of the video calling application.

Alternatively, the communication server may cause the client 502A to present a pop-up window (or other GUI element) proposing a different communication medium, if the proposed recipient does not have an address in the communication medium being used by the user of the client 502A. For example, the pop-up window may include the text. "You are attempting to initiate a video call to "a person who is responsible for preparing slides for a trade conference." Jane Doe has this role. Her email address is "Jane.Doe@example.com". She does not use the video calling application." In response, the user of the client 502A may communicate with the recipient using the proposed communication medium.

After identifying the one or more communication addresses for one or more proposed recipients of the communication, the communication server 504 transmits the one or more communication addresses to the client 502A. The client 502A may present the one or more communication addresses for the user's review, for example, within the input box for specifying the communication addresses. The user may modify the communication addresses or select a GUI element for initiating or transmitting the communication (e.g., a "send" button).

In some cases, the language model 514 includes a GPT engine that is trained using a two-phase process including the phases of pretraining and finetuning. In the pretraining phase, the GPT engine is trained on a corpus of publicly available (e.g., from the Internet) text or audio/video data that is converted into text using speech-to-text technology. The corpus of publicly available text may include text that is distinct from records of the communication directory 516 or descriptions of users of the clients 502A-C and/or the external client 510. For example, the corpus of publicly available text may include at least one of newspaper articles, blog posts, publicly available social media post, or encyclopedia articles. The text is used to create a language model that learns to predict the next word in a sentence given the context of the previous words. The Transformer architecture, specifically the self-attention mechanism, is used to capture dependencies between words and create a representation of the text.

During pretraining, the GPT engine learns to generalize the patterns it observes in the training data. Specifically, the GPT engine learns grammar, facts, reasoning abilities, and some level of world knowledge. The pretraining phase allows the GPT engine to acquire a broad understanding of the natural languages in which the GPT engine is trained.

During the finetuning phase, after pre-training, the GPT engine is further finetuned on specific tasks (e.g., matching a natural language input to a communication address from the communication directory 516) using labeled examples. The labeled examples may publicly available professional biographies (e.g., on social networking websites or company websites) and prompts which are manually (e.g., by users familiar with the associate industries) mapped to the professional biographies. For example, a publicly available professional biography on a law firm website may describe a patent attorney who is located in New York, is a partner at the law firm, and has drafted and prosecuted multiple artificial intelligence patent applications to issue. The natural language input ("senior artificial intelligence patent lawyer in New York") might be mapped to this professional biography. The finetuning phase makes the GPT engine useful for specific applications, such as mapping natural language inputs to professional records or employee records in the communication directory 516. Finetuning involves training the GPT engine on a narrower dataset that may be generated with the help of human reviewers.

The finetuning phase includes providing prompts or instructions to the GPT engine and receiving responses from the GPT engine. For example, a human reviewer may generate a set of professional or employee records and natural language inputs that could be mapped to those records. The human reviewers then review the output generated by the GPT engine and score the output according to the various qualities (e.g., did the GPT engine recommend a communication address that was relevant to the natural language input). The GPT engine uses reinforcement learning to attempt to improve its scores on each (or at least a subset) of the qualities as the finetuning process progresses.

One example use case of the disclosed technology takes place a contact center setting. A user named Fred receives an email alert, from a credit reporting agency, that a credit card application has been filed at ABC Bank in his name. Fred does not remember having filed such an application, so he telephones the contact center of ABC Bank to report that the application is fraudulent. At the contact center of ABC Bank, Fred is connected (e.g., using the agent selection software 408) to an agent named Abby. Abby was trained to assist ABC Bank's customers with managing their accounts and/or opening new accounts. However, Abby has never handled a contact center engagement about a fraudulent credit card application and does not know how to assist Fred. Abby decides to add another agent to the engagement. To do this, Abby selects a user interface icon for adding another agent to the engagement. Abby is prompted to enter the name or a description of the agent to be added. Abbe types, "fraudulent application specialist" into the input box. The phrase "fraudulent application specialist" is provided to the language model 514 of the communication server 504. The language model 514 accesses the communication directory 516 to identify records that match "fraudulent application specialist." The language model 514 identifies the records of Bill and Carly, both of whom work in the fraud department of ABC Bank.

Abby is prompted, via the GUI of her device, to add Bill and Carly to the engagement. Abby notices that Bill is online, while Carly is not online, so Abby approves adding Bill to the engagement and does not approve of adding Carly to the engagement, to reduce the total number of agents involved. Abby adds Bill to the engagement. Bill is able to process Fred's request deny the fraudulent application and remove the inquiry associated with the fraudulent application from Fred's credit report.

By using the disclosed technology, Abby is able to quickly identify Bill as the person who should process Fred's engagement, allowing Fred's inquiry to be resolved promptly and reducing the frustration that Abby would have experienced in locating the appropriate person to handle Fred's engagement on her own without the assistance of the language model 514.

Based on the example above, the disclosed technology may be implemented with the communication comprising a contact center engagement conducted using CCaaS. The client device initiating the communication (or adding a new address to the communication) could be associated with a first contact center agent. The recipient device (corresponding to the new address) may be associated with a specialist contact center agent who is different from the first contact center agent. The natural language input for identifying the new address may include at least one of a department, a skill, or a permission level of the specialist contact center agent.

As described above, the disclosed technology could suggest multiple communication addresses to which a communication is to be directed. To reduce the number of communications each user receives, in some cases, the number of communication addresses proposed could be limited to a predetermined maximum number. The predetermined maximum number may be set by an administrator (e.g., an information technology administrator). In some cases, the predetermined maximum number may be different for different communication media (e.g., five email addresses, two telephone numbers, and/or one voice/video conferencing address). If there are more than the predetermined maximum number of records matching the natural language input in the communication directory 516, the predetermined maximum number of records having the highest scores for matching the natural language input may be selected for output.

Examples of the disclosed technology may be used outside the contact center setting. An example use case of the technology outside the contact center setting is described in conjunction with FIG. 6 below. In another example use case outside the contact center setting, a user uses an internal corporate instant messaging system on their laptop computer. The user composes a new message with the text, "I have a new mobile phone and would like to set up my work email on it. Could you please help me do this." After entering this text, the user presses a button to receive assistance with identifying a recipient. In response, a server (e.g., the communication server 504) accesses a database (e.g., the data repository 506) to identify, from among the employees and other users of the internal corporate instant messaging system, an appropriate recipient for the message based on the message text. For example, an information technology (IT) administrator who specializes in mobile phones and is located in the same geographic location as the user composing the message may be identified as a proposed recipient. The messaging address of the proposed recipient is added to the destination field of the message that is being composed, for the approval of the user prior to transmission of the message.

Figure 6:
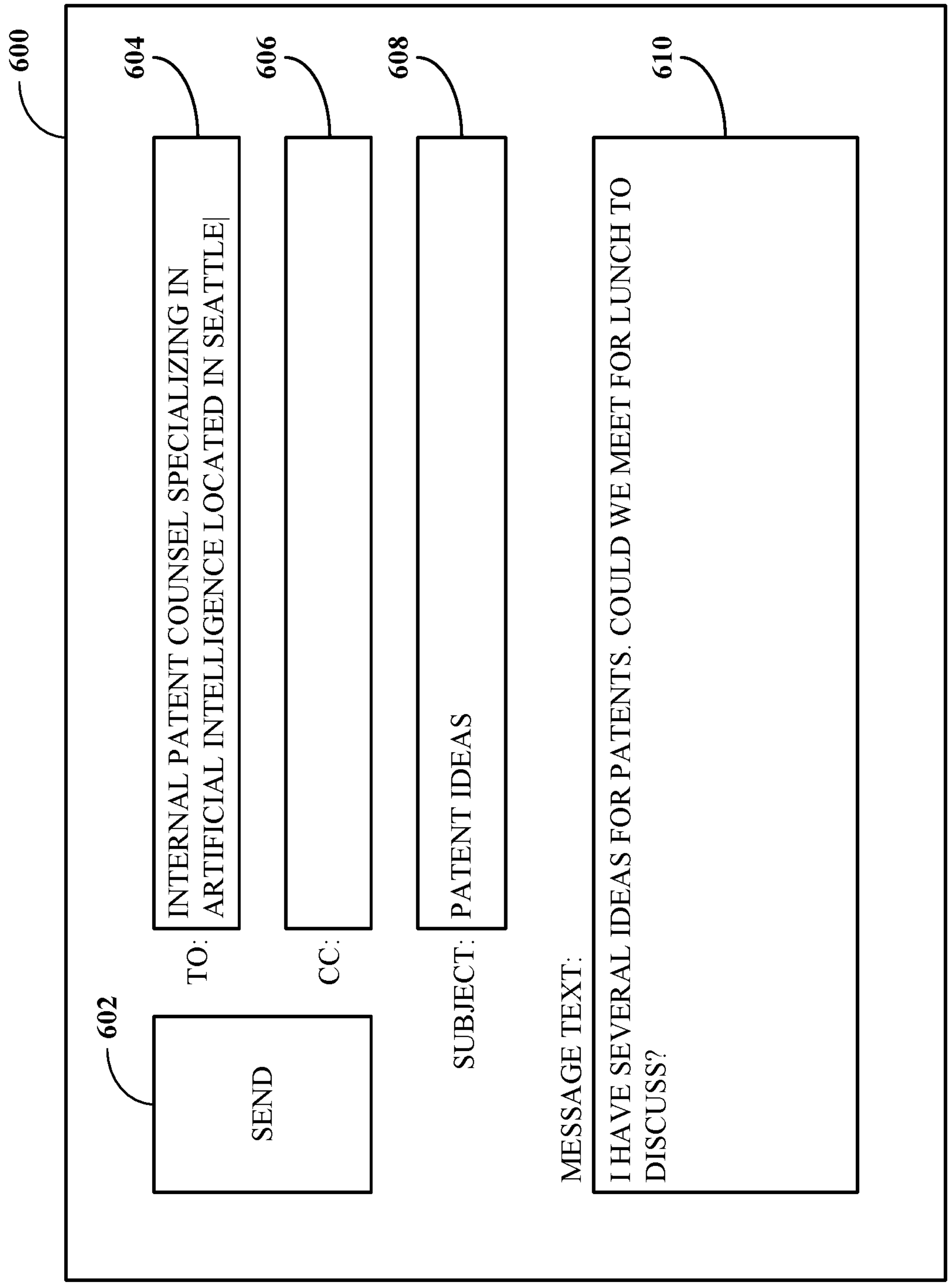
FIG. 6 illustrates a first example graphical user interface for composing an email communication.

FIG. 6 illustrates a first example GUI 600 for composing an email communication. As shown, the GUI 600 includes a send button 602, a "to" input box 604, a carbon copy (CC) input box 606, a subject input box 608, and a message text input box 610. The send button 602, when selected, causes an email message to be sent based on the information in the input boxes 604, 606, 608, 610. The "to" input box 604 is configured to receive a user entry of information associated with entities to receive the email message. The cc input box 606 is configured to receive a user entry of information associated with entities to receive a carbon copy of the email message. The subject input box 608 is configured to receive a user entry of a subject of the email message. The message text input box 610 is configured to receive a user entry of a message text of the email message.

As illustrated, the "to" input box 604 includes the natural language text: "internal patent counsel specializing in artificial intelligence located in Seattle." The cursor (indicated by the character '|') appears immediately following the word "Seattle," indicating that the user is in the process of typing the text in the "to" input box 604. As is well-understood, the phrase "internal patent counsel specializing in artificial intelligence located in Seattle," is not an email address. The cc input box 606 is empty. The subject input box includes the text: "Patent ideas." The message text input box 610 includes the text: "I have several ideas for patents. Could we meet for lunch to discuss?"

After the user finishes typing the text in the "to" input box 604, the user cause the cursor to be moved out of the "to" input box 604, for example, by touching a spot on a touchscreen outside the "to" input box 604, pressing the "tab" key on the keyboard, or clicking a mouse while the mouse cursor (not illustrated) is positioned outside the "to" input box 604. In response to the cursor being moved outside the "to" input box 604, a computer associated with the GUI 600 (e.g., the client 502A) transmits the natural language text in the "to" input box 604 to a server (e.g., the communication server 504) for processing thereat.

The server determines (e.g., using natural language processing technology, such as the language model 514, which accesses a user directory, such as the communication directory 516) one or more email addresses that correspond to the natural language text in the "to" input box 604 and transmits these email addresses to the computer associated with the GUI 600. In response to receiving these email addresses, the computer generates the GUI shown in FIG. 7.

As shown in FIG. 6, the CC input box 606 is blank. In alternative implementations, the CC input box 606 may include natural language text and/or email addresses that are to be copied on the message. As shown in FIG. 6, the "to" input box 604 includes natural language text and no email addresses. In alternative implementations, the user may enter one or more email addresses in addition to the natural language text. For example, the "to" input box 604 may include one or more of the following texts: "jack@example.com, internal patent counsel," "internal patent counsel, jack@example.com," "jack@example.com, internal patent counsel, jill@example.com," "jack@example.com, jill@example.com, internal patent counsel," or "internal patent counsel, jack@example.com, jill@example.com." In any the above example texts, "jack@example.com" and "jill@example.com" are email addresses associated with email accounts, and "internal patent counsel" is natural language text describing a recipient which is processed using the techniques disclosed herein.

Figure 7:
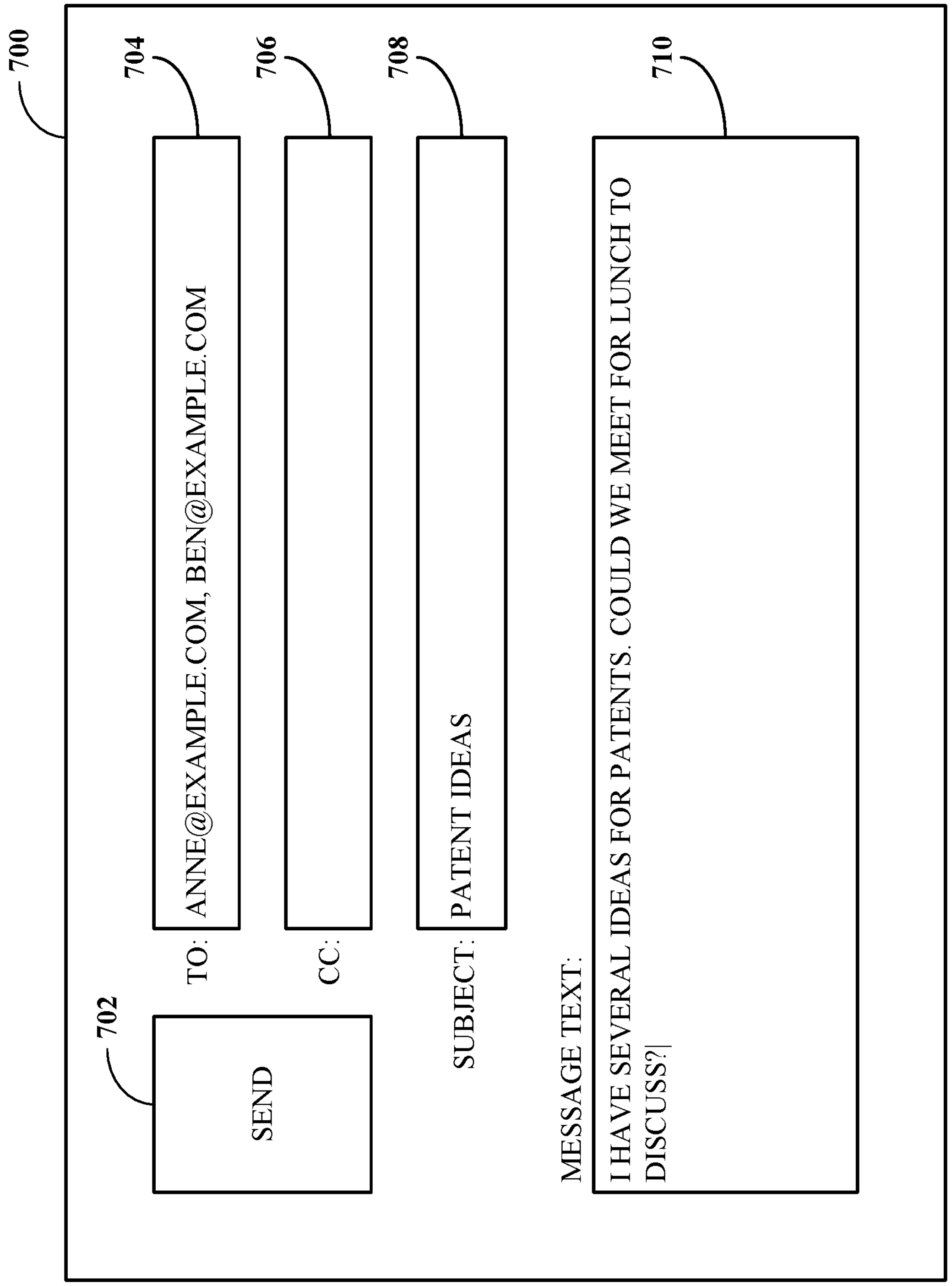
FIG. 7 illustrates a second example graphical user interface for composing an email communication.

FIG. 7 illustrates a second example GUI 700 for composing an email communication. Similar to the GUI 600, the GUI 700 includes a send button 702, a "to" input box 704, a CC input box 706, a subject input box 708, and a message text input box 710. The send button 702 corresponds to the send button 602. The "to" input box 704 corresponds to the "to" input box 604. The CC input box 706 corresponds to the CC input box 606. The subject input box 708 corresponds to the subject input box 608. The message text input box 710 corresponds to the message text input box 610.

As shown, the CC input box 706 is blank, similar to the CC input box 606. The subject input box 708 includes the same text as the subject input box 608. The message text input box 710 includes the same text as the subject input box 610. The "to" input box 704 includes the email addresses: "anne@example.com" and "ben@example.com." These email addresses were generated by the server based on the text in the "to" input box 604 and provided, in the "to" input box 704, for review and approval by the user prior to sending the email message. The user may now send the email message by selecting the send button 702. Alternatively, the user can add or remove email addresses from the "to" input box 704 and/or the CC input box 706 prior to sending the email message. In some cases, the user may access a corporate directory webpage to review the profiles of the users associated with the email addresses "anne@example.com" and "ben@example.com" prior to sending the email message.

As described above, the text in the "to" input box 604 is "internal patent counsel specializing in artificial intelligence located in Seattle." However, it should be noted that natural language text different from the above could be used. For example, in some implementations, a destination field input box, such as the "to" input box 604 may include text incorporating any of the fields in Table 1.

TABLE 1

Examples of natural language text for a destination field.

| Description | Example Natural Language Text |
|---|---|
| Relation to someone in the organization | Ben Bitdiddle's direct reports |
| Skills/knowledge | Expert in Collibra data governance |
| Role | In charge of the Denver data center |
| Attribute | Works remotely in the Eastern time zone |
| Authorization level | Authorized to approve a loan application |
| Permission level | Has permission to edit data stored in customer database |

In some cases, a combination of the natural language texts in Table 1 (or similar texts) may be used. For example a communication may be addressed to "Ben Bitdiddle's direct report who is an expert in Collibra data governance," or to "someone who works remotely in the Eastern time zone and is authorized to approve a loan application."

Examples of the disclosed technology are described herein as being implemented in a unified communications platform within an organization. However, the technology is not limited to this use case. In some cases, this technology may be used in conjunction with external data sources to find an appropriate person or entity to address an inquiry. For example, a person might use their personal email address to compose an email with the text "bed and breakfast in Vermont," in the "to" field. This text in the "to" field could cause a server associated with the email provider to identify email addresses having stored data (e.g., in social media profiles, in place pages in a mapping service, or in webpages identified by a web crawler) that matches the phrase "bed and breakfast in Vermont."

Furthermore, some implementations of the disclosed technology may be applied in the marketing context. For example, a marketer of a coffee shop in Chicago may generate a short messaging service (SMS) message providing a discount on espresso beverages. The marketer may determine a target audience for the SMS message from among users who have provided their telephone numbers (and, in some cases, other data) to the coffee shop. For example, the marketer could specify, in the "to" field of the message, that the message is to be provided to "users who live in Illinois and made a purchase at the coffee shop in the last two weeks." In response, the server may identify mobile numbers of such users in a data repository of the coffee shop and transmit the SMS message to those mobile numbers.

FIG. 6 and FIG. 7 describe example uses of the disclosed technology in the email context, where the communication address is an email address. However, the disclosed technology may be used with other communication media that are different from email. For example, the disclosed technology may be used with instant messaging, and the communication address may be an instant messaging address. The disclosed technology may be used with voice or video conferencing (e.g., via UCaaS), and the communication address may be a conferencing address (e.g., a SIP address). The disclosed technology may be used with telephone technology, and the communication address may be a telephone number.

FIG. 8 illustrates an example of a record 800 in a communication directory. As shown, the record 800 is associated with a person. The record 800 includes contact addresses of the person, including an email address, a mobile number, and a SIP address. The record 800 includes the name of the person, the title of the person, the supervisor of the person, subordinates of the person, skills of the person, experience of the person, education of the person, and a description of the person. The record 800 includes natural language text that is readable by a human and/or by software, such as the language model 514 of the communication server 504.

As illustrated in FIG. 8, the record is associated with a single person. In alternative implementations, a record may be associated with a group of people (e.g., the legal team, the accounting team, the support staff, or Ben Bitdiddle's division) or another entity that has a communication address. If the disclosed technique is implemented outside the organizational context, the record may be associated with any single person or group of people that have a communication address (e.g., the Bitdiddle family, the mock trial team at ABC College, DEF Hotel, or the catering team of GHI Restaurant).

Figure 9:
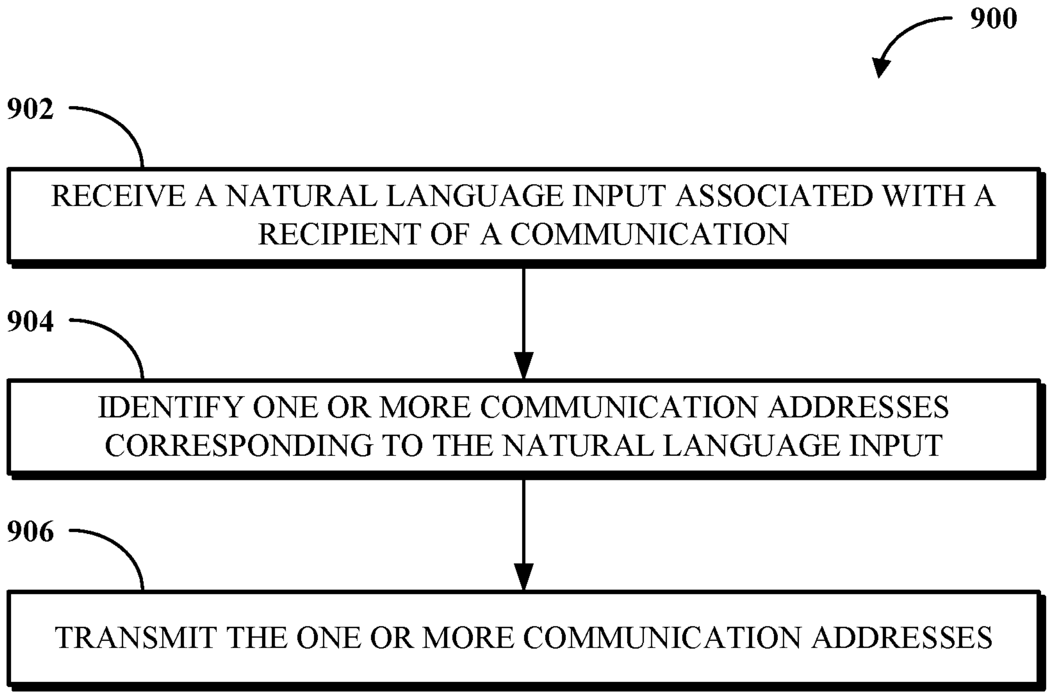
FIG. 9 is a flowchart of an example of a technique for identifying a recipient for a communication.

To further describe some implementations in greater detail, reference is next made to examples of techniques which may be performed by or using a system for identifying a recipient of a communication. FIG. 9 is a flowchart of an example of a technique 900 for using AI to identify a recipient of a communication. The technique 900 can be executed using computing devices, such as the systems, hardware, and software described with respect to FIGS. 1-8. The technique 900 can be performed, for example, by executing a machine-readable program or other computer-executable instructions, such as routines, instructions, programs, or other code. The steps, or operations, of the technique 900, or another technique, method, process, or algorithm described in connection with the implementations disclosed herein can be implemented directly in hardware, firmware, software executed by hardware, circuitry, or a combination thereof.

For simplicity of explanation, the technique 900 is depicted and described herein as a series of steps or operations. However, the steps or operations of the technique 900 in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 902, a server (e.g., the communication server 504) receives, from a client device, (e.g., the client 502A) a natural language input associated with a recipient of a communication. The natural language input is entered, into the client device, via a GUI associated with a communication medium. The communication medium may be, for example, email, telephone, SMS, CCaaS or UCaaS. In some cases, the natural language input corresponds to text of the communication (e.g., a subject of an email or a message text of an email), audio of the communication (e.g., within an audio file attached to the communication), video of the communication, or an attached file of the communication.

At 904, the server identifies, using an AI language model, (e.g., the language model 514) one or more communication addresses of one or more entities corresponding to the natural language input. The one or more communication addresses are associated with the communication medium. For example, if the communication medium is UCaaS, the communication addresses are SIP addresses. If the communication medium is email, the communication addresses are email addresses. If the communication medium is telephone or SMS, the communication addresses are telephone numbers.

To identify the one or more communication addresses, the AI language model accesses an entity directory (e.g., the communication directory 516). The entity directory stores multiple records. Each record stores an entity name (e.g., a name of a person, a group of people, a business or an organization) and a natural language description of the entity. The natural language description may include, for example, a skill, a responsibility, an educational experience, a work experience, a geographic location, a resume, or publicly accessible social media information. Each entity may be able to view and/or edit their associated record in the entity directory.

At 906, the server transmits the one or more communication addresses to the client device. In response, the client device may display the one or more communication addresses in a destination field of the GUI associated with the communication medium. The destination field may be displayed, within the GUI, to the user of the client device. The user may edit the communication addresses in the destination field.

In one example use case, a user attaches a word processing document that is named "suggestions for improving functionality of Boise server" to a UCaaS-based intra-corporate instant messaging application. The user then presses a button or follows a menu to use AI to identify a recipient. In response, the word processing document, including its name and the text in the document, are transmitted to a communication server. The communication server leverages a LLM to access an employee data repository of the corporation to identify an employee who could process the "suggestions for improving functionality of Boise server." The server identifies ten employees on the "Boise Server Information Technology Support" team, with each employee having their own SIP address. However, based on settings created by an administrator of the corporation, the server is limited to proposing a maximum of five addresses for the intra-corporate instant messaging application. Thus, the server selects five of the ten employees that have the highest score for matching the name and the text of the word processing document. The server then outputs the SIP addresses of those employees to the destination field of the GUI of the intra-corporate instant messaging application at the device of the user. The user then selects the "send" button to begin an instant messaging session with the five SIP addresses by transmitting the word processing document to those addresses.

Some implementations are described below as numbered examples (Example 1, 2, 3, etc.). These examples are provided as examples only and do not limit the other implementations disclosed herein.

Example 1 is a method, comprising: receiving, from a client device, a natural language input associated with a recipient of a communication; identifying, using an artificial intelligence language model, one or more communication addresses of one or more entities corresponding to the natural language input; and transmitting the one or more communication addresses to the client device.

In Example 2, the subject matter of Example 1 includes, wherein transmitting the one or more communication addresses to the client device causes replacement of the natural language input with the one or more communication addresses as the recipient of the communication.

In Example 3, the subject matter of Examples 1-2 includes, wherein transmitting the one or more communication addresses to the client device comprises: placing the one or more communication addresses into a destination field of the communication; and causing display, at the client device, of the destination field including the one or more communication addresses for review by a user of the client device.

In Example 4, the subject matter of Examples 1-3 includes, wherein the communication comprises at least one of an email communication, an instant messaging communication, a social media messaging communication, a voice call, or a video conference, and wherein the one or more communication addresses comprise at least one of an email address, an instant messaging address, a conferencing address, or a telephone number.

In Example 5, the subject matter of Examples 1-4 includes, wherein identifying the one or more communication addresses comprises: accessing, by the artificial intelligence language model, an entity directory, wherein the entity directory stores multiple entities and a natural language description of each entity of at least a subset of the multiple entities, wherein the natural language description comprises at least one of a skill, a responsibility, an educational experience, a work experience, a geographic location, a resume, or publicly accessible social media information.

In Example 6, the subject matter of Examples 1-5 includes, wherein the natural language input comprises at least one of text of the communication, audio of the communication, video of the communication, or an attached file of the communication.

In Example 7, the subject matter of Examples 1-6 includes, causing display, at the client device, of a graphical user interface including an input box for the destination field; receiving an indication that the user is providing the natural language input to the input box; receiving, in association with the indication, the natural language input via user input to the input box.

In Example 8, the subject matter of Examples 1-7 includes, wherein the communication comprises a contact center engagement conducted using contact center as a service (CCaaS), wherein the client device is associated with a first contact center agent, wherein the recipient of the communication comprises a specialist contact center agent different from the first contact center agent, wherein the natural language input identifies at least one of a department, a skill, or a permission level of the specialist contact center agent.

In Example 9, the subject matter of Examples 1-8 includes, wherein the communication comprises a unified communications as a service (UCaaS) communication, wherein the one or more communication addresses comprise one or more session initiation protocol (SIP) addresses.

Example 10 is a non-transitory computer readable medium storing instructions operable to cause one or more processors to perform operations comprising: receiving, from a client device, a natural language input associated with a recipient of a communication; identifying, using an artificial intelligence language model, one or more communication addresses of one or more entities corresponding to the natural language input; and transmitting the one or more communication addresses to the client device.

In Example 11, the subject matter of Example 10 includes, wherein transmitting the one or more communication addresses to the client device comprises: placing the one or more communication addresses into a destination field of the communication; and causing display, at the client device, of the destination field including the one or more communication addresses.

In Example 12, the subject matter of Examples 10-11 includes, wherein the communication comprises at least one of an email communication, an instant messaging communication, or a video conference, and wherein the one or more communication addresses comprise at least one of an email address, an instant messaging address, or a conferencing address.

In Example 13, the subject matter of Examples 10-12 includes, wherein identifying the one or more communication addresses comprises: accessing, by the artificial intelligence language model, an entity directory, wherein the entity directory stores multiple entities and a natural language description of each entity of at least a subset of the multiple entities, wherein the natural language description comprises at least one of a skill, a responsibility, an educational experience, a work experience, a geographic location, or a resume.

In Example 14, the subject matter of Examples 10-13 includes, wherein the natural language input comprises at least one of text of the communication, audio of the communication, or an attached file of the communication.

In Example 15, the subject matter of Examples 10-14 includes, the operations further comprising: causing display, at the client device, of a graphical user interface including a destination field input box; receiving an indication that the user is providing the natural language input to the destination field input box; receiving, in association with the indication, the natural language input via user input to the destination field input box.

In Example 16, the subject matter of Examples 10-15 includes, wherein the communication comprises a telephone communication, wherein the one or more communication addresses comprise one or more telephone numbers.

Example 17 is a system, comprising: a memory subsystem; and processing circuitry configured to execute instructions stored in the memory subsystem to: receive, from a client device, a natural language input associated with a recipient of a communication; identify, using an artificial intelligence language model, one or more communication addresses of one or more entities corresponding to the natural language input; and transmit the one or more communication addresses to the client device.

In Example 18, the subject matter of Example 17 includes, wherein transmitting the one or more communication addresses to the client device comprises: causing display, at the client device, of the one or more communication addresses for review by a user of the client device.

In Example 19, the subject matter of Examples 17-18 includes, wherein the communication comprises at least one of an email communication or an instant messaging communication, and wherein the one or more communication addresses comprise at least one of an email address or an instant messaging address.

In Example 20, the subject matter of Examples 17-19 includes, wherein identifying the one or more communication addresses comprises: accessing, by the artificial intelligence language model, an entity directory, wherein the entity directory stores multiple entities and a natural language description of each entity of at least a subset of the multiple entities, wherein the natural language description comprises at least one of a skill, a responsibility, an educational experience, a work experience, a geographic location, or publicly accessible social media information.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

As used herein, unless explicitly stated otherwise, any term specified in the singular may include its plural version. For example, "a computer that stores data and runs software," may include a single computer that stores data and runs software or two computers—a first computer that stores data and a second computer that runs software. Also "a computer that stores data and runs software," may include multiple computers that together stored data and run software. At least one of the multiple computers stores data, and at least one of the multiple computers runs software.

As used herein, the term "computer-readable medium" encompasses one or more computer readable media. A computer-readable medium may include any storage unit (or multiple storage units) that store data or instructions that are readable by processing circuitry. A computer-readable medium may include, for example, at least one of a data repository, a data storage unit, a computer memory, a hard drive, a disk, or a random access memory. A computer-readable medium may include a single computer-readable medium or multiple computer-readable media. A computer-readable medium may be a transitory computer-readable medium or a non-transitory computer-readable medium.

As used herein, the term "memory subsystem" includes one or more memories, where each memory may be a computer-readable medium. A memory subsystem may encompass memory hardware units (e.g., a hard drive or a disk) that store data or instructions in software form. Alternatively or in addition, the memory subsystem may include data or instructions that are hard-wired into processing circuitry.

As used herein, processing circuitry includes one or more processors. The one or more processors may be arranged in one or more processing units, for example, a central processing unit (CPU), a graphics processing unit (GPU), or a combination of at least one of a CPU or a GPU.

As used herein, the term "engine" or "model" may include software, hardware, or a combination of software and hardware. An engine or a model may be implemented using software stored in the memory subsystem. Alternatively, an engine or a model may be hard-wired into processing circuitry. In some cases, an engine or a model includes a combination of software stored in the memory subsystem and hardware that is hard-wired into the processing circuitry.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:

receiving, from a client device, a natural language input associated with a recipient of a communication;

identifying, using an artificial intelligence language model, one or more communication addresses of one or more entities corresponding to the natural language input, wherein identifying the one or more communication addresses comprises:

generating, by the artificial intelligence language model for a plurality of entities, a matching score between the natural language input and a record in a directory associated with a respective entity of the plurality of entities, the matching score being based on matching of the natural language input to a natural language description contained in the record, the artificial intelligence language model comprising a generative pretrained transformer finetuned to match natural language inputs to records; and selecting the one or more entities from the plurality of entities based on the matching score; and transmitting the one or more communication addresses to the client device for selection of one of the one or more communication addresses by a user of the client device.

2. The method of claim 1, wherein transmitting the one or more communication addresses to the client device causes replacement of the natural language input with the one or more communication addresses as the recipient of the communication.

3. The method of claim 1, wherein transmitting the one or more communication addresses to the client device comprises:

placing the one or more communication addresses into a destination field of the communication; and causing display, at the client device, of the destination field including the one or more communication addresses for review by the user of the client device.

4. The method of claim 1, wherein the communication comprises at least one of an email communication, an instant messaging communication, a social media messaging communication, a voice call, or a video conference, and wherein the one or more communication addresses comprise at least one of an email address, an instant messaging address, a conferencing address, or a telephone number.

5. The method of claim 1, wherein identifying the one or more communication addresses comprises:

accessing, by the artificial intelligence language model, an entity directory, wherein the entity directory stores the plurality of entities and the natural language description of each entity of at least a subset of the plurality of entities, wherein the natural language description comprises at least one of a skill, a responsibility, an educational experience, a work experience, a geographic location, a resume, or publicly accessible social media information.

6. The method of claim 1, wherein the natural language input comprises at least one of text of the communication, audio of the communication, video of the communication, or an attached file of the communication.

7. The method of claim 1, further comprising:

causing display, at the client device, of a graphical user interface including an input box for a destination field;

receiving an indication that the user is providing the natural language input to the input box;

receiving, in association with the indication, the natural language input via user input to the input box.

8. The method of claim 1, wherein the communication comprises a contact center engagement conducted using contact center as a service (CCaaS), wherein the client device is associated with a first contact center agent, wherein the recipient of the communication comprises a specialist contact center agent different from the first contact center agent, wherein the natural language input identifies at least one of a department, a skill, or a permission level of the specialist contact center agent.

9. The method of claim 1, wherein the communication comprises a unified communications as a service (UCaaS) communication, wherein the one or more communication addresses comprise one or more session initiation protocol (SIP) addresses.

10. The method of claim 1, wherein selecting the one or more entities based on the matching score comprises:

ordering the plurality of entities by the matching score; and selecting the one or more entities having highest matching scores.

11. The method of claim 1, wherein the record associated with the entity comprises a representation of at least one of a skill, a responsibility, an educational experience, a work experience, a geographic location, a resume, or publicly accessible social media information.

12. A non-transitory computer readable medium storing instructions operable to cause one or more processors to perform operations comprising:

receiving, from a client device, a natural language input associated with a recipient of a communication;

identifying, using an artificial intelligence language model, one or more communication addresses of one or more entities corresponding to the natural language input, wherein identifying the one or more communication addresses comprises:

generating, by the artificial intelligence language model for a plurality of entities, a matching score between the natural language input and a record in a directory associated with a respective entity of the plurality of entities, the matching score being based on matching of the natural language input to a natural language description contained in the record, the artificial intelligence language model comprising a generative pretrained transformer finetuned to match natural language inputs to records; and selecting the one or more entities from the plurality of entities based on the matching score; and transmitting the one or more communication addresses to the client device for selection of one of the one or more communication addresses by a user of the client device.

13. The non-transitory computer readable medium of claim 12, wherein transmitting the one or more communication addresses to the client device comprises:

placing the one or more communication addresses into a destination field of the communication; and causing display, at the client device, of the destination field including the one or more communication addresses.

14. The non-transitory computer readable medium of claim 12, wherein the communication comprises at least one of an email communication, an instant messaging communication, or a video conference, and wherein the one or more communication addresses comprise at least one of an email address, an instant messaging address, or a conferencing address.

15. The non-transitory computer readable medium of claim 12, wherein identifying the one or more communication addresses comprises:

accessing, by the artificial intelligence language model, an entity directory, wherein the entity directory stores the plurality of entities and the natural language description of each entity of at least a subset of the plurality of entities, wherein the natural language description comprises at least one of a skill, a responsibility, an educational experience, a work experience, a geographic location, or a resume.

16. The non-transitory computer readable medium of claim 12, wherein the natural language input comprises at least one of text of the communication, audio of the communication, or an attached file of the communication.

17. The non-transitory computer readable medium of claim 12, the operations further comprising:

causing display, at the client device, of a graphical user interface including a destination field input box;

receiving an indication that the user is providing the natural language input to the destination field input box;

receiving, in association with the indication, the natural language input via user input to the destination field input box.

18. The non-transitory computer readable medium of claim 12, wherein the communication comprises a telephone communication, wherein the one or more communication addresses comprise one or more telephone numbers.

19. A system, comprising:

a memory subsystem; and processing circuitry configured to execute instructions stored in the memory subsystem to:

receive, from a client device, a natural language input associated with a recipient of a communication;

identify, using an artificial intelligence language model, one or more communication addresses of one or more entities corresponding to the natural language input, wherein identifying the one or more communication addresses comprises:

generating, by the artificial intelligence language model for a plurality of entities, a matching score between the natural language input and a record in a directory associated with a respective entity of the plurality of entities, the matching score being based on matching of the natural language input to a natural language description contained in the record, the artificial intelligence language model comprising a generative pretrained transformer finetuned to match natural language inputs to records; and selecting the one or more entities from the plurality of entities based on the matching score; and transmit the one or more communication addresses to the client device for selection of one of the one or more communication addresses by a user of the client device.

20. The system of claim 19, wherein transmitting the one or more communication addresses to the client device comprises:

causing display, at the client device, of the one or more communication addresses for review by the user of the client device.

21. The system of claim 19, wherein the communication comprises at least one of an email communication or an instant messaging communication, and wherein the one or more communication addresses comprise at least one of an email address or an instant messaging address.

22. The system of claim 19, wherein identifying the one or more communication addresses comprises:

accessing, by the artificial intelligence language model, an entity directory, wherein the entity directory stores the plurality of entities and the natural language description of each entity of at least a subset of the plurality of entities, wherein the natural language description comprises at least one of a skill, a responsibility, an educational experience, a work experience, a geographic location, or publicly accessible social media information.

* * * * *